United States Patent [19]
Angle et al.

[11] 3,844,755
[45] Oct. 29, 1974

[54] METHOD AND APPARATUS FOR TRANSFER MOLDING GLASS LENSES

[75] Inventors: Milton A. Angle, Rochester; George L. Bender, Fairport; Gerald E. Blair, Pittsford; Clarence C. Maier, Rochester, all of N.Y.

[73] Assignee: Eastman Kodak Company, Rochester, N.Y.

[22] Filed: Nov. 16, 1972

[21] Appl. No.: 307,254

[52] U.S. Cl............................. 65/32, 65/72, 65/81, 65/157, 65/223, 65/374
[51] Int. Cl. ............. C03b, C03b 7/00, C03b 9/14
[58] Field of Search............ 65/72, 81, 32, 223, 72, 65/157, 374

[56] References Cited
UNITED STATES PATENTS
3,725,023  4/1973  Parris..................................... 65/72

Primary Examiner—S. Leon Bashore
Assistant Examiner—Frank W. Miga
Attorney, Agent, or Firm—R. F. Brothers

[57] ABSTRACT

A method and apparatus for molding of glass into finished optical elements wherein optical glass is placed in a transfer chamber formed of a glasslike carbon material and is subjected to heat and pressure. The softened glass is transferred through a sprue into a mold cavity formed of the same glasslike carbon material. The walls defining the mold cavity and the transfer chamber have high surface quality and high surface accuracy, and the mold cavity is configured to produce optical elements of predetermined shapes.

17 Claims, 5 Drawing Figures

PATENTED OCT 29 1974

METHOD AND APPARATUS FOR TRANSFER MOLDING GLASS LENSES

CROSS REFERENCE TO RELATED APPLICATIONS

Reference is made to commonly assigned copending U.S. Pat. application Ser. No. 340,510, entitled, "METHOD AND APPARATUS FOR MOLDING GLASS LENSES," filed on Mar. 12, 1973, in the names of G. E. Blair, C. C. Maier and W. F. Parsons; and Ser. No. 340,139, entitled, "METHOD AND APPARATUS FOR MOLDING GLASS LENSES," filed on Mar. 12, 1973, in the names of G. E. Blair, C. C. Maier and M. A. Angle.

BACKGROUND OF THE INVENTION

1. Field of the Invention

This invention relates to the manufacture of glass elements, and in particular to the transfer molding of glass into finished lenses.

2. Description of the Prior Art

The manufacture of finished optical elements from glass has long involved a series of complex, slow, and expensive steps such as preliminary molding, shaping, grinding, polishing and centering. Each of these steps is a separate operation requiring complex and expensive apparatus and well trained skilled operators. The manufacturing process is further complicated when the design requires a non-spherical surface as the final grinding and polishing is sometimes done individually for each element. These techniques have been required because, until recently, no materials have been known which could be utilized to mold an optical glass into a finished optical element. Those materials which had suitable physical characteristics, such as strength, temperature stability and conductivity and non-adherence to glass, could not be provided with a surface finish which, on replication by the optical glass, resulted in acceptable molded lenses. Those materials which could be provided with a suitable surface finish either adhered to the glass or had some other detrimental physical or chemical characteristic.

Recently, unique methods and apparatus for molding glass elements in glasslike carbon molds have been developed which are disclosed in the referenced related patent applications, Ser. Nos. 340,510 and 340,139. These applications disclose the manufacture of image forming glass lenses by compression molding of a glass within a glasslike carbon mold cavity. In using such techniques, it has been found that optimum lenses are produced when the glass is in a gob or slug which is formed to a particular initial shape prior to the molding operation, with different initial shapes utilized for different final lens designs. The gob or slug should also be free from serious surface defects which might remain in the surface of the final molded glass element, since the surface of the slug will be the surface of the final element. Moreover, the gob or slug must have a determined volume since the final shape of the lens shoulder and separation of the lens surfaces is determined, in part, by the initial volume of the glass gob or slug. Thus, use of the compression molding embodiments of these unique molding apparatus and processes does eliminate several grinding and polishing steps but these embodiments may require new operations to produce glass gobs or slugs of the required volume, shape and surface quality. While these operations do not have the same quality requirements as in grinding and polishing the lens surface itself, each does involve an additional step in the production of the molded glass element.

SUMMARY OF THE INVENTION

Accordingly, an object of the present invention is to provide improved processes and apparatus for the economic manufacture of molded glass elements.

Another object of the present invention is to provide a process and apparatus for the transfer molding of glass into finished optical elements.

Another object is to provide a process and apparatus for the transfer molding of glass into optical elements suitable for use in photographic apparatus.

A further object is to provide a process and apparatus for the transfer molding of glass into optical elements having a predetermined shape with high surface quality and high surface accuracy.

A still further object is to provide a mold for the transfer molding of glass into finished optical elements.

Another still further object is to provide a mold for the transfer molding of glass into finished optical elements having a predetermined shape with high surface quality and high surface accuracy.

These and other objects are achieved according to this invention by methods and apparatus for the transfer molding of glass from a transfer chamber made of a glasslike carbon into optical elements of predetermined shapes in a mold cavity formed of glasslike carbon. The mold cavity is defined by surfaces which are of high quality and high accuracy, comparable to that of a finished glass optical element.

One preferred embodiment of the molding process according to the present invention comprises the steps of placing a gob or slug of optical glass in a transfer chamber made of a glasslike carbon, heating the chamber to soften the glass, applying pressure to the glass so that the softened glass is transferred through sprues into mold cavities defined by glasslike carbon surfaces of high quality and high accuracy until the glass conforms to the shape of the mold cavities, cooling below the transformation temperature of the glass, removing the pressure and removing the finished optical elements from the mold.

According to another preferred embodiment of this invention, a mold is provided which is manufactured of glasslike carbon and which defines a transfer chamber and a plurality of mold cavities having mold surfaces of high quality and high accuracy which are connected to the transfer chamber by sprues cut through the glasslike carbon. The molding process is implemented by inserting a glass gob or slug into the transfer chamber of the mold, evacuating the mold chamber, outgassing the mold chamber at a relatively low temperature, controlling the atmosphere of the mold chamber so that it is non-oxidizing, heating the glass gob or slug by increasing the temperature of the mold, applying pressure to the glass gob or slug thereby causing transfer of the glass through the sprues into the mold cavities, cooling the mold to bring the glass to a temperature below its transformation point, removing the pressure from the mold, further lowering of the temperature of the mold, and removing the finished optical elements from the mold cavities.

BRIEF DESCRIPTION OF THE DRAWINGS

In the preferred embodiment of the invention described below, reference is made to the accompanying drawings, in which.

DETAILED DESCRIPTION OF THE PREFERRED EMBODIMENTS

Figure 1:
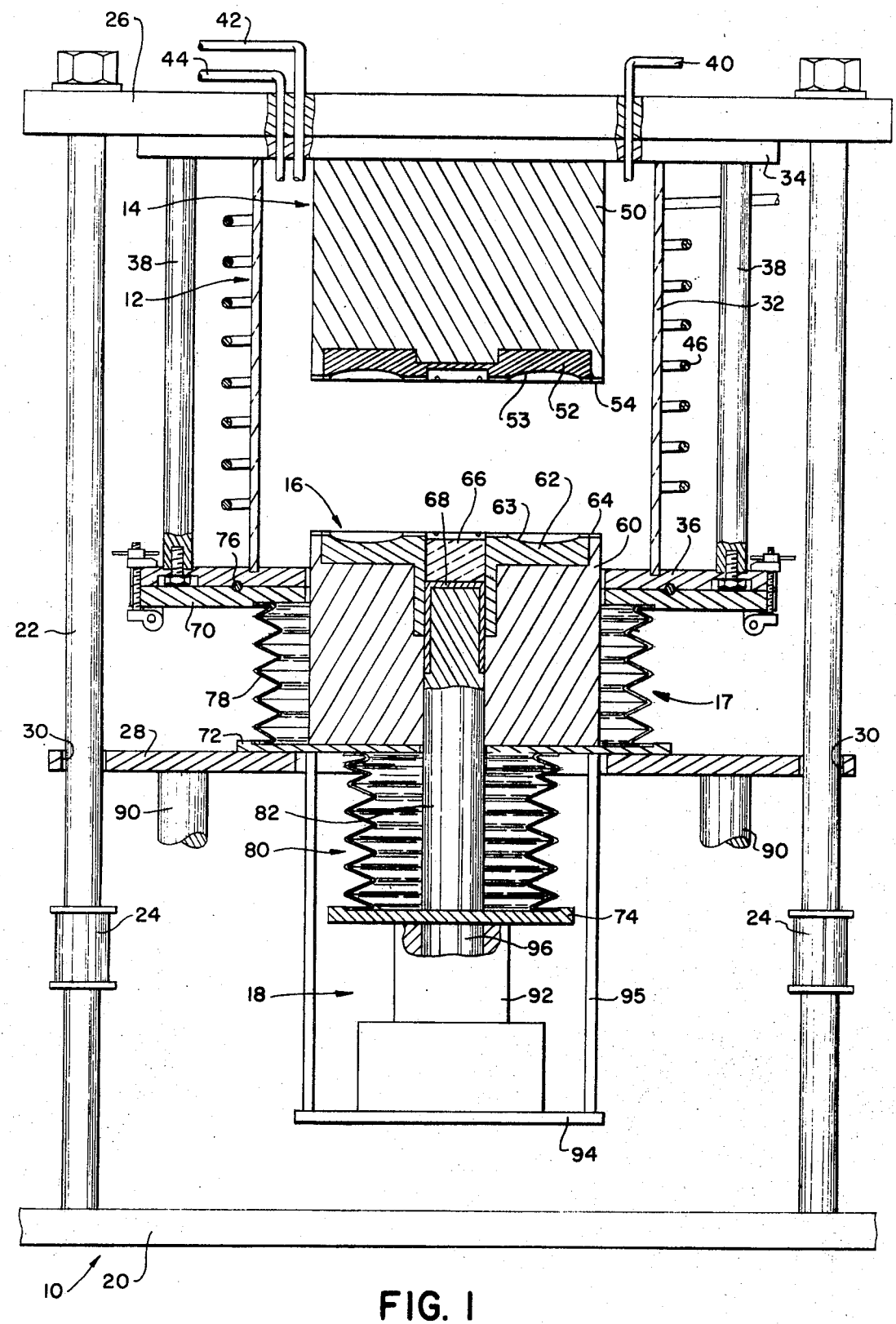
FIG. 1 is a partially cut away view of transfer molding apparatus for producing optical elements according to this invention.

In designing a lens for a particular application, the lens designer selects particular glasses having known optical properties and designs a combination of surface powers and separations which should result in a predicted optical performance. However, even the best optical design will not achieve its predicted performance unless the individual lens elements are manufactured and assembled under carefully controlled conditions. Of particular concern are two characteristics of each optical surface which are known in the art as surface quality and surface accuracy.

Surface quality pertains to the finish of the lens, i.e., the distribution and size of such defects as scratches, digs, pits, "orange peel" and the like on the surface. The quality of the surface of a lens which is to be used in an optical system of the type used in photographic or equivalent apparatus must be high, and the term "high surface quality" is used herein to refer to a finished lens for such use. A lens having a "high surface quality" would not normally require any subsequent grinding or finishing operations.

Surface accuracy, which is also referred to as fit, pertains to the dimensional characteristics of the surface, i.e., the error between the measured radius of curvature and the design parameter, and the uniformity of the curvature of the surface. The degree of surface accuracy is generally measured by an interferometric comparison of a lens surface with a test plate gauge, by counting the number of Newton's rings produced by a specific wavelength of light and by examining the regularity of the rings. The degree of surface accuracy or fit of a lens at a specific wavelength is generally expressed as its power (the number of Newton's rings which are counted) and its irregularity (the difference between the number of rings counted in perpendicular directions across the fring pattern). The lower the power and irregularity, the higher the surface accuracy of the lens. Thus, a lens having a high surface accuracy or a "precise fit" is one which has dimensional characteristics which are extremely close to their design value and which are very uniform. The surface accuracy of a lens used in many applications in photographic apparatus is considered high when it has a power of less than six rings and an irregularity of less than three rings.

One factor which has impeded the development of a process for molding finished glass lenses is the tendency of molten or softened glass to adhere to certain materials and to accurately replicate the surface structure of known mold material. Recently, glasslike carbon materials were developed for use as sheathing in nuclear reactors and these materials have found many applications in the electronics and metallurgy fields. A new use for glasslike carbon has been discovered and is disclosed in copending application Ser. No. 340,510. We have discovered improved methods and apparatus for the utilization of glasslike carbon in the optical field. It has been found that glasslike carbon can be polished to a glassy finish to which softened glass will not permanently adhere. In addition, the replication of such a surface by the glass has been found to leave the glass with a high surface quality. This new group of carbons has been given the generic term "glasslike" because they exhibit a glassy surface appearance, when polished, conchoidal fracture, internal-friction characteristics resembling glass more closely than normal graphite, and gas impermeability comparable to that of glass. Glasslike carbons are known under a variety of names such as the following: glass carbon, vitreous carbon, LMSC glassy carbon, Carbone Vitreus, vitro carbon and cellulose carbon. Glasslike carbon is prepared by the termal degradation of organic polymers, and has a crystal structure with a maximum crystal size which is often about 20 A. Glasslike carbon is chemically inert with many materials and it is isotropic. Further description of the chemical and physical properties of glasslike carbon as well as specific methods for preparing such a material are disclosed in U.S. Pat. Nos. 3,446,593 and 3,109,712 and in Shigehiko Yamada, A Review of Glasslike Carbons, Defense Ceramic Information Center (DCIC) Report 68-2, Battelle Memorial Institute, 1968. Since there are no detectable crystal lattices or grain boundaries, it is possible to give the material the highly polished, specular surface referred to above. The term glasslike carbon is used herein to describe a material which, while it may exhibit all of the characteristics described in this paragraph, exhibits at least the following characteristics: prepared by the thermal degradation of an organic polymer, substantially chemically inert with heated glass and isotropic.

Figure 2:
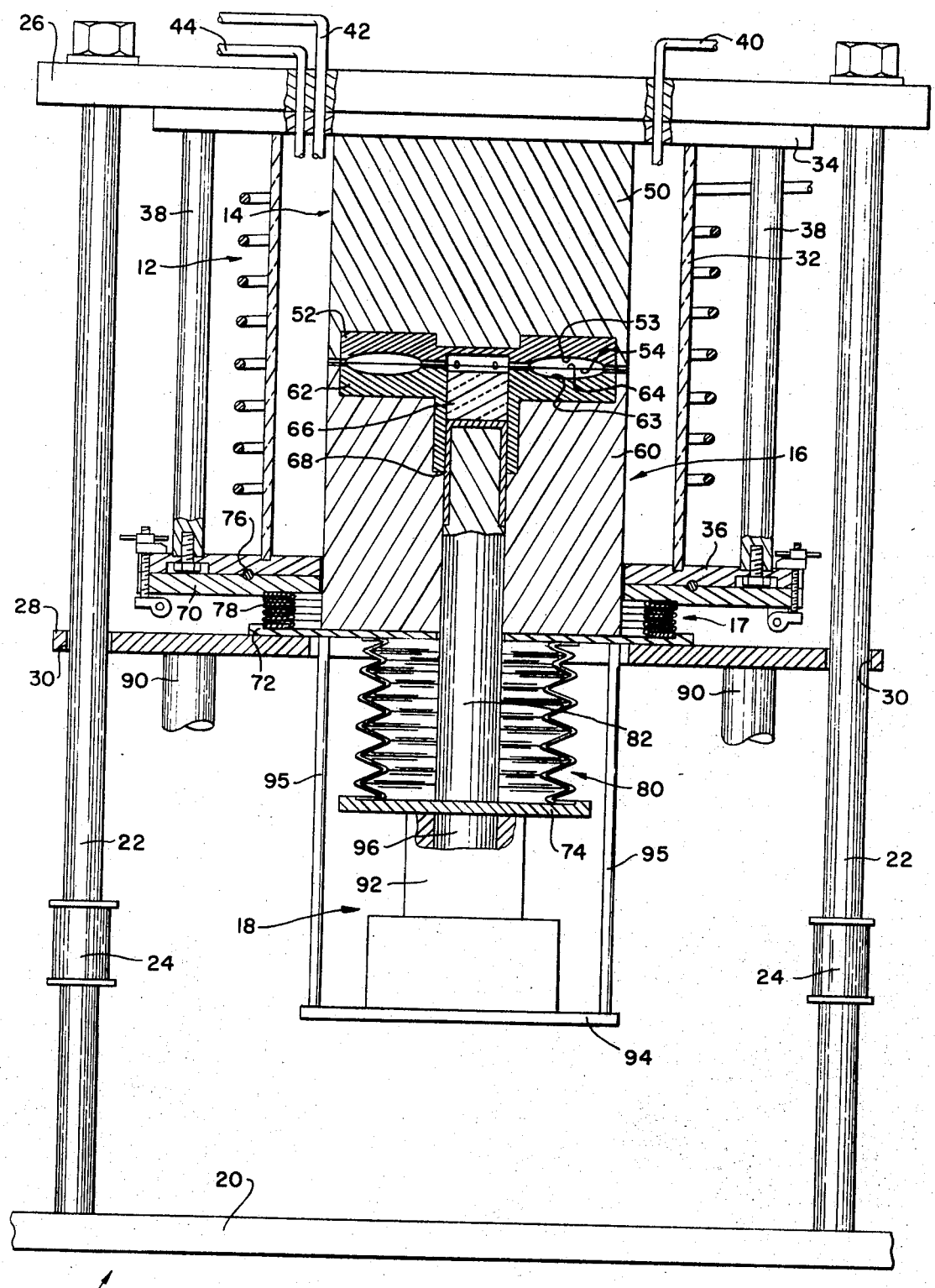
FIG. 2 is a view showing the molding apparatus of FIG. 1 in a closed condition, just prior to molding.

The present invention provides an improved method and apparatus for transfer molding finished glass lenses, utilizing a mold made from a glasslike carbon such as is described above. Molding apparatus with which the molding process of the present invention may be practiced is illustrated in FIGS. 1 and 2. The apparatus comprises a support assembly 10, a molding chamber 12, an upper mold assembly 14, a lower mold assembly 16, a sealing assembly 17 and a press assembly 18. Support assembly 10 consists of a support member 20 on which are mounted support rods 22, stops 24 and a fixed upper support plate 26. A bottom support plate 28 is provided with apertures 30 through which support rods 22 extend so that plate 28 may be moved in a vertical direction away from stops 24 in a manner which will be described in more detail hereinafter.

Molding chamber 12 is defined by wall 32 which has a generally cylindrical shape and which is fixedly held between upper and lower mounting plates 34 and 36 by means of mounting rods 38. Wall 32 may be made of a transparent material such as plastic or glass, or alternatively could be made of metal. Access is provided to the interior of molding chamber 12 by means of a vacuum line 40 through which the atmosphere in the chamber may be exhausted, a gas line 42 through which a controlled atmosphere may be introduced into the chamber and an exhaust line 44 to provide an exit means for the controlled atmosphere. Standard gas valves (which are not shown) may be attached to lines 40, 42 and 44 to properly regulate the atmosphere present in molding chamber 12. A heating coil 46 is mounted outside of chamber 12 so as to surround the molding area and to provide heat to upper and lower mold assemblies 14 and 16. While heating coil 46 is shown outside of chamber 12, this is done for ease of assembly. Coil 46 could be positioned within chamber 12 and could also take any other form known in the art which will provide sufficient heat to molding chamber 12 to permit molding of the optical glass contained therein.

Upper mold assembly 14 consists of a graphite base 50 and a mold insert 52 disposed on the lower face 54 of base 50. Base 50 is fixedly mounted on upper mounting plate 34 and extends downwardly into molding chamber 12 so as to be surrounded by transparent wall 32 and heating coil 46. Lower mold assembly 16 consists of a graphite base 60 and a mold insert 62 disposed on the upper face 64 of base 60. Mold insert 62 extends into the interior of base 60 so as to form a transfer chamber 66. Base 60 is coupled to movable support plate 28 to enter into molding chamber 12 and to be brought into conjunction with upper mold assembly 14 so that mold inserts 52 and 62 define a molding cavity therebetween. Mold inserts 52 and 62 will be described in more detail hereinafter.

Chamber 12 may be sealed by sealing assembly 17 which comprises upper, middle and lower sealing plates 70, 72 and 74, sealing ring 76 and bellows 78 and 80. Bellows 78 is disposed between upper plate 70 and middle plate 72 and is mounted on each to provide a vacuum seal. Bellows 80 is disposed between middle plate 72 and lower plate 74 and is mounted on each to provide a vacuum seal. Plates 70, 72 and 74 and bellows 78 and 80 thus form a single unit for mounting within the molding apparatus. When assembled, upper plate 70 may be clamped or bolted to plate 36 with sealing ring 76 disposed therebetween in mating grooves so as to provide a vacuum seal. Middle plate 72 rests on support plate 28 and is movable therewith. Base 60 rests on middle plate 72 and is movable therewith so that base 60 extends through central apertures in plates 36 and 70 into the interior of chamber 12. Ram 82 rests on lower plate 74 and extends through base 60 into transfer chamber 66, terminating in a cap 68 formed of glasslike carbon such as is used for inserts 52 and 62.

Press assembly 18 consists of chamber pistons 90 and a molding press 92, each of which may consist of conventional pneumatic pistons such as are known in the art or other hydraulic, mechanical or appropriate means for producing the desired movement. Chamber pistons 90 are mounted so as to bear against support plate 28. Molding press 92 is supported by mounting plate 94, which is fixedly mounted on middle plate 72 and supported by mounting rods 95 movable therewith. Ram 96 is movable within press 92 so as to bear against lower plate 74.

For assembly of the molding apparatus, plate 28 will be in its downward position, resting upon stops 24. Sealing assembly 17 may now be positioned so that plate 72 is resting upon plate 28. Bellows 78 will be extending upwardly and will be supporting plate 70 which will not yet be sealed to plate 36. Bellows 80 will be extending downwardly, with plate 74 resting on ram 96 and molding press 92 supported by plate 94. A glass gob or slug may now be positioned within transfer chamber 66.

Chamber pistons 90 may now be actuated to produce displacement of support plate 28 in a vertical direction along mounting rods 22. Upward movement of plate 28 is continued until plate 70 may be clamped to plate 36 with sealing ring 76 disposed in the mating grooves. Upward movement of plate 28 causes middle plate 72 to move upward, thereby moving base 60 upwardly through the apertures in plates 36 and 70 into molding chamber 12. Displacement of base 60 under the urging of chamber pistons 90 continues until bases 50 and 60 are brought together with mold inserts 52 and 62 aligned to form a mold cavity of the desired shape for production of optical elements, as is illustrated in FIG. 2. During movement of base 60 upwardly, bellows 78 will be compressed while maintaining a vacuum seal for molding chamber 12. After heating of mold chamber 12, molding press 92 acts through ram 96 to produce upward movement of plate 74, thereby forcing ram 82 upward while compressing bellows 80 so as to maintain a vacuum within chamber 12. Movement of ram 82 forces softened glass present in transfer chamber 66 into the mold cavity formed by mold inserts 52 and 62.

Figure 4:
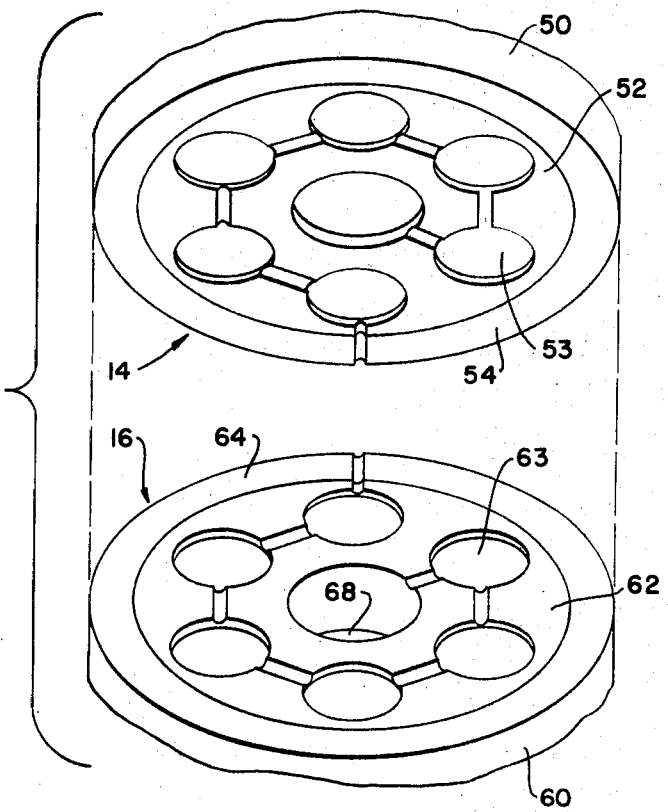
FIG. 4 is a detailed view of an alternate embodiment of a mold insert suitable for use in the molding apparatus of this invention.
Figure 3:
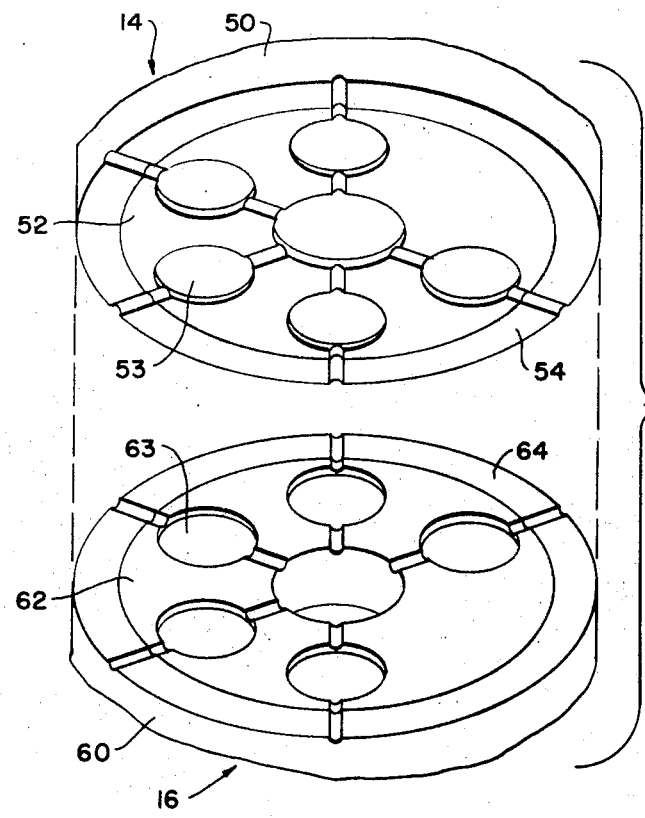
FIG. 3 is a detailed view of a mold insert suitable for use in the molding apparatus of the invention.

Mold inserts 52 and 62 and cap 68 are made of a glasslike carbon as is described hereinbefore and the inserts may take either a parallel or a serial format as is illustrated in FIGS. 3 and 4. FIG. 3 illustrates mold inserts 52 and 62 in which cavities 53 and 63 defined by inserts 52 and 62 are in parallel, each of them receiving softened glass from transfer chamber 66 at the same time interval after pressure is applied to the softened glass in transfer chamber 66. It should be noted that, in the preferred practice of the invention, the transfer chamber and the sprues connecting the mold cavities with the transfer chamber should be made of the same glasslike carbon as the mold inserts. This prevents contamination of the glass and minimizes stress variations which might result in strain in the molded optical element. FIG. 4 illustrates mold inserts 52 and 62 in which mold cavities 53 and 63 are in series with softened glass entering the mold cavities at one point only and then flowing through each of the mold cavities serially until it reaches the last mold cavity. This arrangement is permissible with this apparatus because mold inserts 52 and 62 are at substantially the same temperature as the glass contained within transfer chamber 66. Outlet sprues are provided in each type of insert to permit the atmosphere within the mold cavity to be evacuated and to permit excess glass to flow out of the mold cavity. While the glasslike carbon molds have preferably been illustrated as inserts on relatively sturdy support members, the support members are present for heat transfer and to add strength and durability to the molding apparatus. Molding of finished optical elements could also be achieved in molding apparatus which did not include supports or which had non-graphite supports.

Since heat softened glass replicates surfaces with which it comes into intimate contact, the surfaces of the cavity-defining walls must be rendered extremely smooth and dimensionally accurate. This can be accomplished by grinding and polishing these walls until they reach the tolerance limits established for the final lens. As indicated previously, the high surface accuracy required of lenses of the quality used in photographic apparatus should frequently be within six Newton rings of power and three rings of irregularity. Surface accuracy well within these tolerances has been achieved in the walls defining the cavities of the glasslike carbon molds. Likewise, these same mold walls must have high surface quality as is required of the finished lenses, which renders the walls substantially devoid of scratches, digs, pits and the like, and such surface quality has also been achieved in the practice of this invention. During these grinding and polishing operations, the mold cavities may also be configured to yield a finished optical element of a predetermined shape with a molded mounting shoulder and the ridges and grooves associated with mounting seats. The walls defining the cavities are shaped much like the predetermined shape of the lens and lens shoulder to be produced by the mold, but provisions may have to be made for dimensional changes occurring in the molded glass due to temperature changes and the like during and after the molding process. Thus, the finished molded element will be ready for final assembly without subsequent grinding and polishing.

According to a preferred method of molding optical elements by this invention, a quantity of glass is placed within transfer chamber 66. The glass must be shaped to fit within chamber 66 but need not be preformed to a different volume and shape for different lens designs. Moreover, the surface of the gob or slug need not be of high quality. Chamber pistons 90 are then actuated to move plate 28 upwardly until plates 36 and 70 may be clamped or bolted together with base 60 extending through the apertures in mounting plates 36 and 70. Movement of plate 28 is then continued until base 60 is brought into contact with base 50 thereby defining a mold cavity between inserts 52 and 62. Bellows 78 will be compressed while maintaining a vacuum seal, as is illustrated in FIG. 2. The atmosphere within chamber 12 may now be evacuated through vacuum line 40 with the air in the mold cavity passing out through the outlet sprues. Simultaneously, heat is introduced into chamber 12 by means of coils 46 to outgas chamber 12, and the surfaces of inserts 52 and 62 and the glass. The desired controlled atmosphere may now be introduced into chamber 12 by means of gas line 42 and exhaust line 44. Heating coils 46 are again actuated causing continued heating of bases 50 and 60, and mold inserts 52 and 62 and the glass in melting chamber 66 until the desired molding temperature is reached. The temperature of inserts 52 and 62 may be monitored by thermocouples or other suitable means. When the desired insert temperature has been attained, the glass and inserts 52 and 62 will be at substantially although not necessarily exactly the same temperature. Molding press 92 may now be actuated to apply pressure to the softened glass in transfer chamber 66 through ram 96, plate 74 and ram 82, thereby forcing the glass out of transfer chamber 66 and into the mold cavities defined by inserts 52 and 62. After a suitable molding time, the temperature of the mold will be reduced gradually to bring the temperature below the glass transformation point while still maintaining a load on the glass remaining in transfer chamber 66, to prevent distortion of glass as the temperature is reduced. After the glass transformation temperature has been reached, the load may be removed from molding press 92 and the molds cooled further before separation to prevent oxidation of the molds. After a suitable time, plates 36 and 70 may be unclamped and chamber pistons 90 may be actuated to move in a downwardly direction, thereby permitting base 60 to move away from base 50 and permitting access to the optical elements for removal from the mold.

Specific conditions under which the process of this invention can be practiced are as follows:

with chamber pistons 90 in their downward position and plate 28 resting on stops 24, an optical glass may be placed within transfer chamber 66, after which chamber pistons 90 are actuated to move base 60 in an upwardly direction so as to enter molding chamber 12 through the apertures in plates 36 and 70, the plates being clamped together to form a vacuum seal and base 60 being brought into contact with base 50 to form a mold cavity between inserts 52 and 62;

molding chamber 12 is now evacuated by means of vacuum line 40 to approximately 100 microns and simultaneously, outgasing of the surfaces of the glass and inserts 52 and 62 at a temperature which will not cause oxidation of the mold surfaces is accomplished by heating of molding chamber 12 to between 200°C and 300°C by means of heating coils 46;

vacuum line 40 is now closed and a forming gas of 95% nitrogen and 5% hydrogen is introduced into chamber 12 through gas line 42, with a slight over pressure maintained by means of exhaust line 44;

the power to induction coils 46 is now readjusted to raise the temperature within molding chamber 12 until the glass is softened sufficiently to pass through the sprues from transfer chamber 66, for most glasses this requires a temperature between 700°C and 800°C and a time of approximately 5 to 20 minutes;

a load is now applied by molding press 92 to ram 96, thereby pressing cap 68 against the softened glass within chamber 66 and forcing the glass through the sprues into the mold cavities defined by inserts 52 and 62, the load applied being in the range of 50 psi to 5,000 psi and being applied for a time in the range of 1 minute to 20 minutes, with a higher load requiring a shorter loading time;

heating of the mold members is now terminated while a load is maintained on ram 96 until a temperature below the transformation temperature of the glass being molded is reached, for most optical glasses this will be a temperature between 550°C and 600°C;

the load on ram 96 may now be removed and the temperature of the mold and glass elements allowed to cool to a temperature which precludes oxidation of the surface of the molds upon opening the mold, preferably this temperature should be 300°C or less; and the mold may now be opened by movement of chamber pistons 90 in a downward direction with unclamping of plates 36 and 70 and the finished molded optical elements may be removed from lower mold insert 62.

As a specific example of an optical element molded by this process, a dense barium crown glass was molded in the following steps: after introduction of the glass into chamber 66, closing of chamber 12, outgasing and introduction of the controlled atmosphere described above, the glass was brought to a temperature of 730°C in 10 minutes, the glass was then subjected to a load of 400 psi for 20 minutes, the mold and molded element were then cooled for a period of 20 minutes to bring the temperature below 300°C and the molded element was then removed from the mold.

Figure 5:
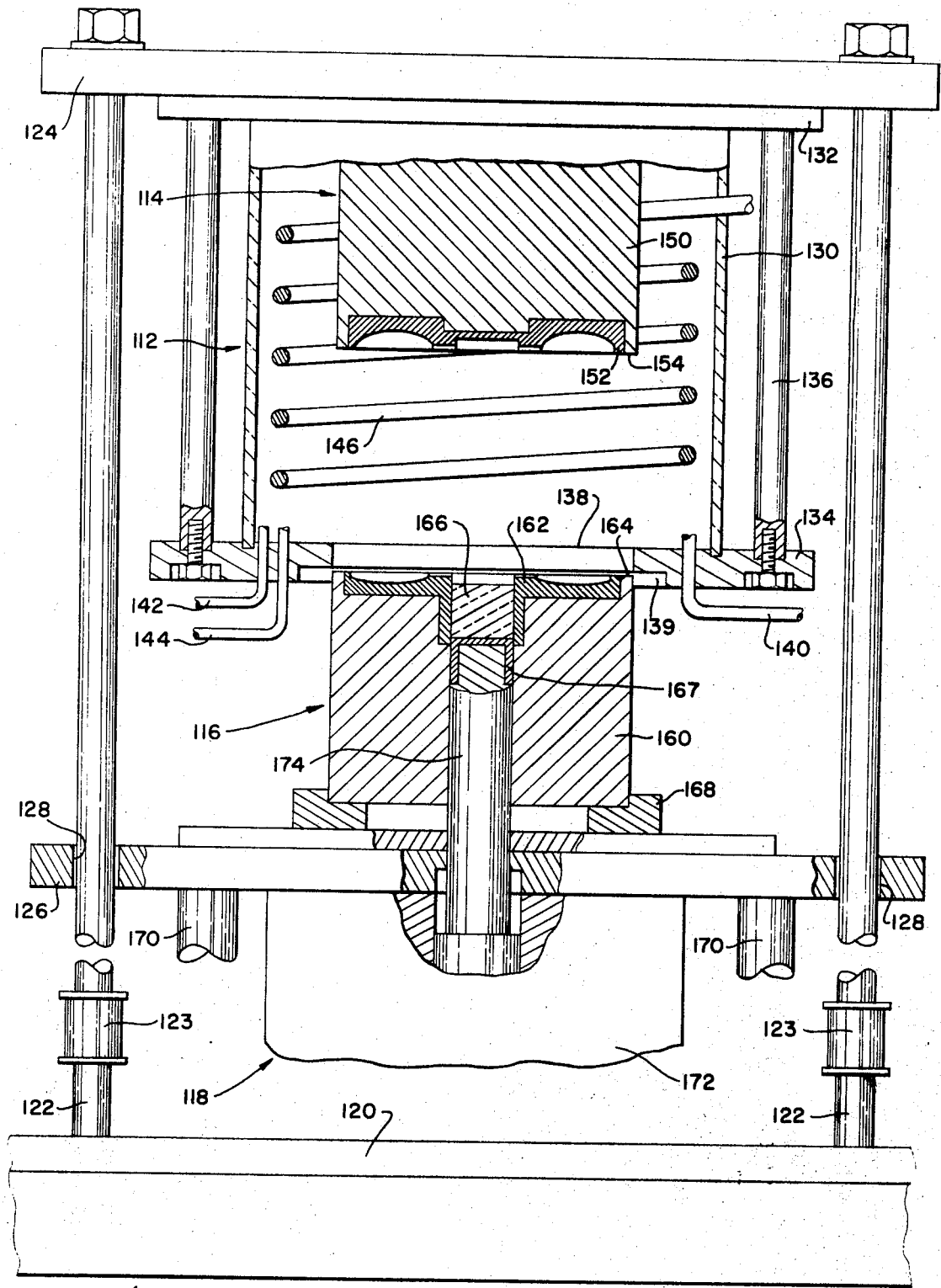
FIG. 5 is a partially cut away view of an alternate embodiment of transfer molding apparatus for practicing this invention.

An alternate embodiment of molding apparatus with which the molding process of the present invention may be practiced is illustrated in FIG. 5. The apparatus comprises a support assembly 110, a molding chamber 112, an upper mold assembly 114, a lower mold assembly 116, and a press assembly 118. Support assembly 110 consists of a support member 120 on which are mounted support rods 122, stops 123, and a fixed upper support plate 124. A bottom support plate 126 is provided with apertures 128 through which support rods 122 extend so that plate 128 may be moved in a vertical direction away from stops 123 in a manner which will be described in more detail hereinafter.

Molding chamber 112 is defined by a wall 130 which has a generally cylindrical shape, which may be transparent and which is fixedly held between upper and lower mounting plates 132 and 134 by means of mounting rods 136. Lower mounting plate 134 further defines a generally cylindrical aperture 138 and a shoulder 139 surrounding aperture 138. Access is provided to the interior of molding chamber 112 by means of a vacuum line 140 through which the atmosphere may be exhausted from chamber 112, a gas line 142 through which a controlled atmosphere may be introduced into chamber 112 and an exhaust line 144 to provide exit means for the controlled atmosphere. Standard valves (which are not shown) may be attached to lines 140, 142 and 144 to properly regulate the atmosphere present in molding chamber 112. A heating coil 146 is mounted within chamber 112 so as to surround the molding area and to provide heat to upper and lower mold assemblies 114 and 116. While coil 146 is shown and described as within chamber 112, it could also be outside so long as sufficient energy is supplied to the molds to attain the required temperatures.

Upper mold assembly 114 consists of a graphite base 150 and a mold insert 152 disposed on the lower face 154 of base 150. Base 150 is fixedly mounted on upper mounting plate 132 and extends downwardly into molding chamber 112 so as to be surrounded by wall 130. Lower mold assembly 116 consists of a base 160 and a mold insert 162 disposed on the upper face 164 of base 160. Mold insert 162 extends into the interior of base 160 so as to define a transfer chamber 166. Base 160 is of a generally cylindrical shape and is configured so as to pass through aperture 138 in lower mounting plate 134. Base 160 is fixedly mounted on lower support plate 126 by means of a mounting block 168 which is configured to mate with shoulder 139 and an O-ring (not shown) to provide a vacuum seal when base 160 has passed through aperture 138. Mold inserts 152 and 162 are made of glasslike carbon and may be of either the serial or parallel form as illustrated in FIGS. 3 and 4. Bases 150 and 160 are made of graphite.

Press assembly 118 consists of chamber pistons 170 and a molding press 172, each of which may be conventional pneumatic pistons such as are known in the art or any hydraulic, mechanical or other appropriate means for producing the required movement. Chamber pistons 170 act to produce displacement of support plate 126 in a vertical direction along mounting rods 122. Upward movement of plate 126 causes base 160 to be moved upwardly into contact with base 150 thereby forming a mold cavity between inserts 152 and 162. Molding press 172 has a ram 174 which extends through base 160 and which terminates in a top cap 167 which is formed of the same glasslike carbon as inserts 152 and 162. Ram 174 extends through base 160 so that cap 167 is positioned as a bottom wall of chamber 166. When ram 174 is properly positioned, a glass gob or slug placed in transfer chamber 166 will be surrounded by glasslike carbon surfaces. Ram 174 acts within base 160 to force softened glass present in transfer chamber 166 into the mold cavity formed by mold inserts 152 and 162.

Operation of the apparatus illustrated in FIG. 5 is substantially the same as previously described. With plate 126 resting on stops 123, a glass gob or slug may be placed in transfer chamber 166. Pistons 170 then operate to move plate 126 upwardly, thereby moving base 160 through aperture 138 in plate 134. Displacement of base 160 under the urging of chamber piston 170 continues until bases 150 and 160 are brought together with mold inserts 152 and 162 aligned to form a glasslike carbon mold cavity of the desired shape for production of optical elements. A vacuum seal will be formed by the mating of mounting block 168 with shoulder 139 on plate 134. Chamber 112 may then be evacuated with air escaping from the mold cavity through the outlet sprues and simultaneously heated by coil 146 to outgas chamber 112, inserts 152 and 162 and the glass in chamber 166. A controlled atmosphere may now be introduced into chamber 112 through gas line 142 and exhaust line 144. When outgasing is complete, the temperature in chamber 112 is raised and maintained until the glass in chamber 166 has been softened sufficiently for molding. Pressure is applied against the softened glass by press 172 through ram 174 until the softened glass has flowed into the mold cavity. The temperature is then reduced below the glass transformation point, at which time the load may be removed and the mold cooled further until a temperature is reached which will not cause oxidation of the surfaces of the molds. After a suitable time, pistons 170 may be withdrawn, permitting the apparatus to be opened for removal of the finished molded optical element.

The invention has been described in detail with particular reference to preferred embodiments thereof but it will be understood that variations and modifications can be effected within the spirit and scope of the invention. In particular, it should be noted that the apparatus shown is only exemplary of transfer molding apparatus for operation of the present invention and other types of molding apparatus in which different elements may be moved to define a mold chamber and a mold cavity may be utilized for practice of this invention.

We claim:

1. A method of molding glass comprising the steps of:

providing surfaces of glasslike carbon, the glasslike carbon being a form of carbon which has been prepared by the thermal degradation of an organic polymer, which is substantially chemically inert with heated glass, and which is isotropic, and the surfaces defining a transfer chamber and at least one mold cavity and the surfaces further defining at least one sprue connecting the transfer chamber and the mold cavity;

placing glass within the transfer chamber;

heat softening the glass; and applying pressure to the heat softened glass until the glass is transferred from the transfer chamber through the sprue into the mold cavity.

2. A method of molding glass comprising the steps of:

providing surfaces of glasslike carbon, the glasslike carbon being a form of carbon which has been prepared by the thermal degradation of an organic polymer, which is substantially chemically inert with heated glass, and which is isotropic, and the surfaces defining a transfer chamber and mold cavities and the surfaces further defining sprues connecting the transfer chamber and the mold cavities;

placing glass within the transfer chamber;

pre-heating the surfaces and the glass;

establishing a non-oxidizing atmosphere around the surfaces and the glass;

heat softening the glass; and applying pressure to the heat softened glass until the glass is transferred from the transfer chamber through the sprues into the mold cavities.

3. A method of molding glass comprising the steps of:

providing surfaces of glasslike carbon, the surfaces defining a transfer chamber and mold cavities and the surfaces further defining sprues connecting the transfer chamber and the mold cavities, and the glasslike carbon being a form of carbon which has been prepared by the thermal degradation of an organic polymer, which is substantially chemically inert with heated glass, and which is isotropic;

placing glass within the transfer chamber;

heat softening the glass;

applying pressure to the heat softened glass until the glass in the transfer chamber is transferred through the sprues into the mold cavity;

cooling the surfaces and glass while applying pressure to the glass remaining within the transfer chamber until the temperature of the glass has been reduced below the transformation temperature of the glass; and removing the force from the glass and further cooling the surfaces and the glass.

4. A method of molding glass comprising the steps of:

providing surfaces of glasslike carbon, the surfaces defining a transfer chamber and mold cavities and the surfaces further defining sprues connecting the transfer chamber and the mold cavities, and the glasslike carbon being a form of carbon which has been prepared by the thermal degradation of an organic polymer, which is substantially chemically inert with heated glass, and which is isotropic;

placing glass within the transfer chamber;

preheating the surfaces and the glass;

establishing a non-oxidizing atmosphere around the surfaces and the glass;

heat softening the glass;

applying pressure to the heat softened glass until the glass in the transfer chamber is transferred through the sprues into the mold cavity;

cooling the surfaces and the glass while applying pressure to the glass remaining within the transfer chamber until the temperature of the glass has been reduced below the transformation temperature of that glass; and removing the force from the glass and further cooling the mold members.

5. A method of molding glass comprising the steps of:

providing a mold assembly including a transfer chamber, a mold cavity and a sprue, the transfer chamber, the mold cavity and the sprue being defined by glasslike carbon surfaces, the glasslike carbon being a form of carbon which has been prepared by the thermal degradation of an organic polymer, which is substantially chemically inert with heated glass, and which is isotropic, and the sprue connecting the transfer chamber and the mold cavity;

placing glass in the transfer chamber;

applying heat to the mold assembly until the glass has been heat softened;

applying pressure to the glass in the transfer chamber until the glass has been transferred through the sprue into the mold cavity; and removing the molded glass.

6. A method of molding glass comprising the steps of:

providing a mold assembly including a transfer chamber, a mold cavity and a sprue, the transfer chamber, the mold cavity and the sprue being defined by glasslike carbon surfaces, the glasslike carbon being a form of carbon which has been prepared by the thermal degradation of an organic polymer, which is substantially chemically inert with heated glass, and which is isotropic, and the sprue connecting the transfer chamber and the mold cavity;

placing glass in the transfer chamber;

preheating the mold assembly and the glass;

establishing a non-oxidizing atmosphere around the mold assembly and the glass;

applying heat to the mold assembly until the glass has been heat softened;

applying pressure to the glass in the transfer chamber until the glass has been transferred through the sprue into the mold cavity; and removing the molded glass.

7. A method of molding glass comprising the steps of:

providing a mold assembly including a transfer chamber, a mold cavity and a sprue, the transfer chamber, the mold cavity and the sprue being defined by glasslike carbon surfaces, the glasslike carbon being a form of carbon which has been prepared by the thermal degradation of an organic polymer, which is substantially chemically inert with heated glass, and which is isotropic, and the sprue connecting the transfer chamber and the mold cavity;

placing glass in the transfer chamber;

applying heat to the mold assembly until the glass has been heat softened;

applying pressure to the glass in the transfer chamber until the glass has been transferred through the sprue into the mold cavity;

cooling the mold assembly while applying pressure to the glass remaining within the transfer chamber until the temperature of the glass has been reduced below the transformation temperature of that glass;

removing pressure from the glass and further cooling the mold assembly; and removing the molded glass.

8. A method of molding glass comprising the steps of:

providing a mold assembly including a transfer chamber, a mold cavity and a sprue, the transfer chamber, the mold cavity and the sprue being defined by glasslike carbon surfaces, the glasslike carbon being a form of carbon which has been prepared by the thermal degradation of an organic polymer, which is substantially chemically inert with heated glass, and which is isotropic, and the sprue connecting the transfer chamber and the mold cavity;

placing glass in the transfer chamber;

preheating the mold assembly and the glass;

establishing a non-oxidizing atmosphere around the mold assembly and the glass;

applying heat to the mold assembly until the glass has been heat softened;

applying pressure to the glass in the transfer chamber until the glass has been transferred through the sprue into the mold cavity;

cooling the mold assembly while applying pressure to the glass remaining within the transfer chamber until the temperature of the glass has been reduced below the transformation temperature of that glass;

removing pressure from the glass and further cooling the mold assembly; and removing the molded glass.

9. A method of molding glass comprising the steps of:

providing a plurality of mold members that are relatively movable between open and closed positions, the mold members defining a transfer chamber and further defining, when in their closed positions, mold cavities and sprues connecting the transfer chamber and the mold cavities, the transfer chamber, the mold cavities and the sprues being defined by surfaces of glasslike carbon, and the glasslike carbon being a form of carbon which has been prepared by the thermal degradation of an organic polymer, which is substantially chemically inert with heated glass, and which is isotropic;

placing glass within the transfer chamber;

moving the mold members to their closed positions;

heat softening the glass at a temperature within the range of 700°C to 800°C;

applying a pressure within the range of 50 psi to 5,000 psi to the glass within the transfer chamber until the glass is transferred through the sprues into the mold cavities;

moving the mold members to their open positions; and removing the molded glass.

10. A method of molding glass comprising the steps of:

providing a plurality of mold members that are relatively movable between open and closed positions, the mold members defining a transfer chamber and further defining, when in their closed positions, mold cavities and sprues connecting the transfer chamber and the mold cavities, the transfer chamber, the mold cavities and the sprues being defined by surfaces of glasslike carbon, and the glasslike carbon being a form of carbon which has been prepared by the thermal degradation of an organic polymer, which is substantially chemically inert with heated glass, and which is isotropic;

placing glass within the transfer chamber;

moving the mold members to their closed positions;

preheating the glass and the mold members to a temperature within the range of 200°C to 300°C;

establishing an atmosphere of 95% nitrogen and 5% hydrogen around the mold members and the glass;

heat softening the glass at a temperature within the range of 700°C to 800°C;

applying a pressure within the range of 50 psi to 5,000 psi to the glass within the transfer chamber until the glass is transferred through the sprues into the mold cavities;

moving the mold members to their open positions; and removing the molded glass.

11. A method of molding glass comprising the steps of:

providing a plurality of mold members that are relatively movable between open and closed positions, the mold members defining a transfer chamber and further defining, when in their closed positions, mold cavities and sprues connecting the transfer chamber and the mold cavities, the transfer chamber, the mold cavities and the sprues being defined by surfaces of glasslike carbon, and the glasslike carbon being a form of carbon which has been prepared by the thermal degradation of an organic polymer, which is substantially chemically inert with heated glass, and which is isotropic;

placing glass within the transfer chamber;

heat softening the glass at a temperature within the range of 700°C to 800°C;

applying a pressure within the range of 50 psi to 5,000 psi to the glass within the transfer chamber until the glass is transferred through the sprues into the mold cavities;

cooling the mold members to a temperature within the range of 550°C to 600°C while maintaining the pressure on the glass remaining in the transfer chamber;

removing the pressure on the glass and cooling the mold members to a temperature of approximately 300°C;

moving the mold members to their open positions; and removing the molded glass.

12. A method of molding glass comprising the steps of:

providing a plurality of mold members that are relatively movable between open and closed positions, the mold members defining a transfer chamber and further defining, when in their closed positions, mold cavities and sprues connecting the transfer chamber and the mold cavities, the transfer chamber, the mold cavities and the sprues being defined by walls of glasslike carbon, and the glasslike carbon being a form of carbon which has been prepared by the thermal degradation of an organic polymer, which is substantially chemically inert with heated glass, and which is isotropic;

placing glass within the transfer chamber;

moving the mold members to their closed positions;

preheating the glass and the mold members to a temperature within the range of 200°C to 300°C;

establishing an atmosphere of 95% nitrogen and 5% hydrogen around the mold members and the glass;

heat softening the glass at a temperature within the range of 700°C to 800°C;

applying a pressure within the range of 50 psi to 5,000 psi to the glass within the transfer chamber until the glass is transferred through the sprues into the mold cavities;

cooling the mold members to a temperature within the range of 550°C to 600°C while maintaining the pressure on the glass remaining in the transfer chamber;

removing the pressure on the glass and cooling the mold members to a temperature of approximately 300°C;

moving the mold members to their open positions; and removing the molded glass.

13. Apparatus for molding glass comprising:

a plurality of mold members having open and closed positions and formed of glasslike carbon, the glasslike carbon being a form of carbon which has been prepared by the thermal degradation of an organic polymer, which is substantially chemically inert with heated glass, and which is isotropic, said mold members defining a transfer chamber and further defining, when in their closed positions, mold cavities and sprues connecting said transfer chamber and said mold cavities;

means for supporting said mold members and for moving said mold members between their open and closed positions;

means for heating said mold members above the softening point of glass contained within said transfer chamber; and means for applying pressure to softened glass contained within said transfer chamber to transfer the glass from said transfer chamber through said sprues into said molding cavities.

14. Apparatus for molding glass comprising:

mold members having open and closed positions and formed of glasslike carbon, the glasslike carbon being a form of carbon which has been prepared by the thermal degradation of an organic polymer, which is substantially chemically inert with heated glass, and which is isotropic, said mold members including surfaces configured to define a transfer chamber and to further define, when said mold members are in said closed positions, mold cavities and sprues connecting said transfer chamber and said mold cavities;

means for supporting said mold members and for moving said mold members between their open and closed positions;

means defining a molding chamber surrounding said mold members and within which said mold members are movable to their closed positions;

means for controlling the atmosphere within said molding chamber;

means for heating said mold members above the softening point of a glass contained within said transfer chamber; and means for applying pressure to softened glass contained within said transfer chamber to transfer the glass from said transfer chamber through said sprues into said mold cavities.

15. A mold for glass comprising a plurality of mold members formed of glasslike carbon, the glasslike carbon being a form of carbon which has been prepared by the thermal degradation of an organic polymer, which is substantially chemically inert with heated glass, and which is isotropic, said mold members being relatively movable between open and closed positions, said mold members defining a transfer chamber and further defining, when in said closed positions, a plurality of mold cavities and sprues connecting said transfer chamber and said mold cavities to permit transfer of glass from said transfer chamber through said sprues into said mold cavities.

16. A mold according to claim 15 where said mold members define a sprue between said transfer chamber and each of said plurality of mold cavities, whereby each mold cavity may simultaneously receive glass from said transfer chamber.

17. A mold according to claim 15 where said mold members define a sprue between said transfer chamber and a first one of said plurality of mold cavities, and said mold members further define a sprue between each of said mold cavities and at least one other of said mold cavities, whereby said mold cavities may sequentially receive glass from said transfer chamber.

* * * * *